United States Patent
Tanaka et al.

(10) Patent No.: US 10,874,909 B2
(45) Date of Patent: Dec. 29, 2020

(54) GOLF BALL

(71) Applicant: Sumitomo Rubber Industries, Ltd., Kobe (JP)

(72) Inventors: Mami Tanaka, Kobe (JP); Toshiyuki Tarao, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 16/653,603

(22) Filed: Oct. 15, 2019

(65) Prior Publication Data

US 2020/0114213 A1 Apr. 16, 2020

(30) Foreign Application Priority Data

Oct. 16, 2018 (JP) ................. 2018-195343

(51) Int. Cl.
| | |
|---|---|
| *A63B 37/06* | (2006.01) |
| *A63B 37/00* | (2006.01) |
| *C09D 175/08* | (2006.01) |
| *C09D 7/65* | (2018.01) |
| *C09D 7/40* | (2018.01) |

(52) U.S. Cl.
CPC ............ *A63B 37/0022* (2013.01); *C09D 7/65* (2018.01); *C09D 7/69* (2018.01); *C09D 7/70* (2018.01); *C09D 175/08* (2013.01); *A63B 37/0031* (2013.01); *A63B 37/0053* (2013.01); *A63B 37/0073* (2013.01); *A63B 37/0074* (2013.01); *A63B 37/0075* (2013.01); *A63B 37/0076* (2013.01); *A63B 37/0095* (2013.01); *A63B 37/0096* (2013.01)

(58) Field of Classification Search
CPC .................................................. A63B 37/0022
USPC .......................................................... 473/378
See application file for complete search history.

(56) References Cited

U.S. PATENT DOCUMENTS

| 6,454,667 B1 | 9/2002 | Iwami |
| 10,238,920 B2 | 3/2019 | Inoue et al. |

(Continued)

FOREIGN PATENT DOCUMENTS

| JP | 2000-288125 A | 10/2000 |
| JP | 2003-265650 A | 9/2003 |

(Continued)

*Primary Examiner* — Raeann Gorden
(74) *Attorney, Agent, or Firm* — Birch, Stewart, Kolasch & Birch, LLP (57) ABSTRACT

An object of the present invention is to provide a golf ball comprising a paint film having improved abrasion resistance without substantially lowering the spin performance. The present invention provides a golf ball comprising a golf ball body and a paint film formed on a surface of the golf ball body, wherein the paint film contains a resin fine particle in an amount of less than 10 parts by mass with respect to 100 parts by mass of a base resin thereof, the base resin of the paint film is a polyurethane, and the resin fine particle contains a polyrotaxane component having a cyclodextrin, a linear molecule penetrating the cyclic structure of the cyclodextrin in a skewering manner, and a blocking group located at both terminals of the linear molecule to prevent disassociation of the cyclodextrin, wherein at least a part of hydroxyl groups of the cyclodextrin is modified with a caprolactone chain via a —O—$C_3H_6$—O— group.

18 Claims, 3 Drawing Sheets

(56) References Cited

U.S. PATENT DOCUMENTS

| | | | |
|---|---|---|---|
| 2003/0176242 A1 | 9/2003 | Mano | |
| 2005/0282660 A1 | 12/2005 | Isogawa et al. | |
| 2011/0053708 A1 | 3/2011 | Isoagawa et al. | |
| 2011/0077106 A1* | 3/2011 | Fitchett | A63B 37/0022 473/385 |
| 2011/0244989 A1 | 10/2011 | Tarao et al. | |
| 2016/0136484 A1* | 5/2016 | Inoue | A63B 37/0022 473/377 |

FOREIGN PATENT DOCUMENTS

| | | |
|---|---|---|
| JP | 2006-556 A | 1/2006 |
| JP | 2006-75209 A | 3/2006 |
| JP | 2006-75210 A | 3/2006 |
| JP | 2007-125178 A | 5/2007 |
| JP | 2011-67595 A | 4/2011 |
| JP | 2011-217820 A | 11/2011 |
| JP | 2011-251135 A | 12/2011 |
| JP | 2016-93386 A | 5/2016 |

* cited by examiner

GOLF BALL

FIELD OF THE INVENTION

The present invention relates to an improvement technology for a paint performance of a golf ball.

DESCRIPTION OF THE RELATED ART

A paint film is formed on a surface of a golf ball body. It has been proposed to improve golf ball properties by improving the paint film.

JP 2011-67595 A discloses a golf ball comprising a core, a cover disposed outside the core, and a paint layer disposed outside the cover, wherein the cover has a Shore D hardness of 61 or less, and the paint layer has a martens hardness of 2.0 mgf/μm$^2$ or less. The golf ball disclosed in JP 2011-67595 A has excellent spin performance, spin rate stability and paint layer durability.

JP 2011-217820 A discloses a golf ball comprising a golf ball body and a paint film formed on a surface of the golf ball body, wherein the paint film has a martens hardness of 2.0 mgf/μm$^2$ or less, and a ratio (50% modulus/10% modulus) of 50% modulus of the paint film to 10% modulus of the paint film is 1.6 or more. The golf ball disclosed in JP 2011-217820 A has a high spin rate on approach shots under a wet condition and a rough condition.

A golf ball having a large launch angle and easily stopping has been proposed in JP 2006-75209 A and JP 2006-75210 A. JP 2006-75209 A discloses a golf ball comprising a golf ball body and a paint layer covering a surface of the golf ball body, wherein a resin component constituting the paint layer is cured by a polyamide-based curing agent, and the golf ball has a static friction coefficient of 0.22 or less. JP 2006-75210 A discloses a golf ball comprising a golf ball body and a paint film covering the golf ball body, wherein the paint film contains metal particles.

A golf ball having improved durability and scuff resistance has been proposed in JP 2000-288125 A. JP 2000-288125 A discloses a golf ball having excellent durability, comprising a core, a cover and one or more paint layer formed on the cover, wherein the cover has a Shore D hardness of from 50 to 65 and a bending elastic modulus of from 1000 to 2000 kgf/cm$^2$, and at least an outermost layer of the paint layer has a 10% elastic modulus of from 5 to 50 kgf/cm$^2$.

A golf ball having improved spin retention rate without sacrificing required paint film properties has been proposed in JP 2003-265650 A. JP 2003-265650 A discloses a golf ball comprising a core, at least one cover covering the core, and a paint film formed on an outer surface of the cover, wherein the paint film has a thickness in a range of 25 μm or more and 125 μm or less and a 50% elastic modulus in a range of 5 MPa or more and 50 MPa or less, and when a thickness of an outermost cover is defined as CL (mm), and the thickness of the paint film is defined as PL (μm), R represented by the following formula (1) is in a range of 0.01 or more and 0.5 or less.

$$R=PL/CL/1000 \qquad (1)$$

JP 2016-093386 A discloses a golf ball comprising a golf ball body and a paint film formed on a surface of the golf ball body, wherein the paint film is formed from a curing type paint composition composed of a base material containing a polyrotaxane and a curing agent containing a polyisocyanate, and the polyrotaxane has a cyclodextrin, a linear molecule piercing through the cyclic structure of the cyclodextrin, and blocking groups located at both terminals of the linear molecule to prevent disassociation of the cyclodextrin, wherein at least a part of hydroxyl groups of the cyclodextrin is modified with a caprolactone chain via a —O—C$_3$H$_6$—O— group.

JP 2011-251135 A discloses a golf ball comprising a golf ball body having an outer surface provided with a plurality of dimples thereon, and a coating coated on the outer surface of the golf ball body, wherein the coating contains a resin and a plurality of particles, and the particles have an average size of from 400 nm to 40 micron.

JP 2007-125178 A discloses a golf ball having a paint film on a surface portion thereof, wherein the paint film has composite particles dispersed therein, the composite particles are polyurethane gel fine particles having a surface covered with polyurea colloid particles deposited from a polyurea colloid nonaqueous solvent solution, wherein the polyurethane gel fine particles are three-dimensionally crosslinked and constituted by a polyisocyanate compound and a compound not having a polyethylene oxide group and having an activated hydrogen, in which at least one of the compounds is trifunctional or more.

JP 2006-556 A discloses a golf ball comprising a golf ball body and a paint film covering the golf ball body, wherein the paint film is obtained from a waterborne paint, and has an elongation at break of 80% or more and a maximum stress of 170 kgf/cm$^2$ (16.7 MPa) or more.

SUMMARY OF THE INVENTION

For example, JP 2006-556 A discloses a method of adjusting mechanical properties of the paint film to improve impact resistance and abrasion resistance of the paint film. However, in the conventional method of adjusting the mechanical properties of the paint film to improve the impact resistance and abrasion resistance of the paint film, the following problems occur. For example, if the paint film is made soft, there is a problem that the spin rate on driver shots increases and the flight distance on driver shots becomes short. On the other hand, if the paint film is made hard, there is a problem that the spin rate on approach shots decreases and the controllability on approach shots is lowered. In view of such condition, a technology of improving the abrasion resistance of the paint film without substantially lowering the spin performance is desired.

The present invention has been achieved in view of the above problems. An object of the present invention is to provide a golf ball having a paint film improving abrasion resistance without substantially lowering spin performance.

The present invention provides a golf ball comprising a golf ball body and a paint film formed on a surface of the golf ball body, wherein the paint film contains resin fine particles in an amount of less than 10 parts by mass with respect to 100 parts by mass of a base resin thereof, the base resin of the paint film includes a polyurethane, and the resin fine particles contain a polyrotaxane component having a cyclodextrin, a linear molecule penetrating the cyclic structure of the cyclodextrin in a skewering manner, and blocking groups located at both terminals of the linear molecule to prevent disassociation of the cyclodextrin, wherein at least a part of hydroxyl groups of the cyclodextrin is modified with a caprolactone chain via a —O—C$_3$H$_6$—O— group.

According to the present invention, the abrasion resistance of the paint film can be improved without substantially lowering the spin performance.

DESCRIPTION OF THE PREFERRED EMBODIMENT

The present invention provides a golf ball comprising a golf ball body and a paint film formed on a surface of the golf ball body, wherein the paint film contains resin fine particles in an amount of less than 10 parts by mass with respect to 100 parts by mass of a base resin thereof, the base resin of the paint film includes a polyurethane, and the resin fine particles contain a polyrotaxane component having a cyclodextrin, a linear molecule penetrating the cyclic structure of the cyclodextrin in a skewering manner, and blocking groups located at both terminals of the linear molecule to prevent disassociation of the cyclodextrin, wherein at least a part of hydroxyl groups of the cyclodextrin is modified with a caprolactone chain via a —O—$C_3H_6$—O— group.

First, the resin fine particles containing the polyrotaxane component (hereinafter sometimes referred to as "polyrotaxane fine particles") used in the present invention will be explained. The paint film of the golf ball according to the present invention contains the resin fine particles containing the polyrotaxane component. The polyrotaxane component has a cyclodextrin, a linear molecule piercing through the cyclic structure of the cyclodextrin, and blocking groups located at both terminals of the linear molecule to prevent disassociation of the cyclic molecule. The polyrotaxane is viscoelastic, since the cyclodextrin molecule is movable along the linear molecule that penetrates the cyclodextrin in a skewering manner (pulley effect). Even if a tension is applied to the polyrotaxane, the tension can be uniformly dispersed due to the pulley effect.

The cyclodextrin is a general term for an oligosaccharide having a cyclic structure. The cyclodextrin is, for example, a molecule having 6 to 8 D-glucopyranose residues being linked in a cyclic shape via an α-1,4-glucoside bond. Examples of the cyclodextrin include α-cyclodextrin (number of glucose units: 6), β-cyclodextrin (number of glucose units: 7), and γ-cyclodextrin (number of glucose units: 8), and α-cyclodextrin is preferable. As the cyclodextrin, one type may be used solely, and two or more types may be used in combination.

The linear molecule is preferably a linear molecule piercing through the cyclic structure of the cyclodextrin so that the cyclic structure of the cyclodextrin is rotatable around the linear molecule. Examples of the linear molecule include polyalkylene, polyester, polyether, and polyacrylic acid. Among them, polyether is preferable, polyethylene glycol is particularly preferable. Polyethylene glycol has less steric hindrance, and thus can easily penetrate the cyclic structure of the cyclodextrin in a skewering manner.

The weight average molecular weight of the linear molecule is preferably 5,000 or more, more preferably 6,000 or more, and is preferably 100,000 or less, more preferably 80,000 or less.

The linear molecule preferably has functional groups at both terminals thereof. When the linear molecule has the functional group, the linear molecule can easily react with the blocking group. Examples of the functional group include a hydroxyl group, carboxyl group, amino group, and thiol group.

The blocking group is not particularly limited, as long as it is located at both terminals of the linear molecule to prevent disassociation of the cyclodextrin from the linear molecule. Examples of the method for preventing the disassociation include a method of using a bulky blocking group to physically prevent the disassociation, and a method of using an ionic blocking group to electrostatically prevent the disassociation. Examples of the bulky blocking group include a cyclodextrin and an adamantyl group. The number of the cyclodextrins penetrated by the linear molecule preferably ranges from 0.06 to 0.61, more preferably ranges from 0.11 to 0.48, and even more preferably ranges from 0.24 to 0.41, if the maximum number thereof is deemed as 1. This is because if the number is less than 0.06, the pulley effect may not be exerted, and if the number exceeds 0.61, the cyclodextrins are very densely located, so that the movability of the cyclodextrin may decrease.

As the polyrotaxane, a polyrotaxane having at least a part of hydroxyl groups of the cyclodextrin being modified with a caprolactone chain, is preferred. Modifying with the caprolactone enhances the compatibility of the polyrotaxane with the polyurethane which is used as the base resin component constituting the paint film. Further, modifying with the caprolactone enhances the flexibility of the polyrotaxane, thereby enhancing the spin performance on approach shots.

As the above modification, for example, the hydroxyl groups of the cyclodextrin are treated with propylene oxide to hydroxypropylate the cyclodextrin, and then ε-caprolactone is added to perform ring-opening polymerization. As a result of this modification, the caprolactone chain —(CO($CH_2$)$_5$O)nH (n is a natural number of 1 to 100) is linked to the exterior side of the cyclic structure of the cyclodextrin via —O—$C_3H_6$—O— group. "n" represents the degree of polymerization, and is preferably a natural number of 1 to 100, more preferably a natural number of 2 to 70, and even more preferably a natural number of 3 to 40. At another terminal of the caprolactone chain, a hydroxyl group is formed through the ring-opening polymerization.

The ratio of the hydroxyl groups modified with the caprolactone chain to all the hydroxyl groups (100 mole %) included in the cyclodextrin before the modification is preferably 2 mole % or more, more preferably 5 mole % or more, and even more preferably 10 mole % or more, and is preferably 100 mole % or less, more preferably 90 mole % or less, and even more preferably 80 mole % or less. If the ratio of the hydroxyl groups modified with the caprolactone chain falls within the above range, the flexibility of the polyrotaxane is greater, and thus the spin performance is further enhanced.

Figure 1:
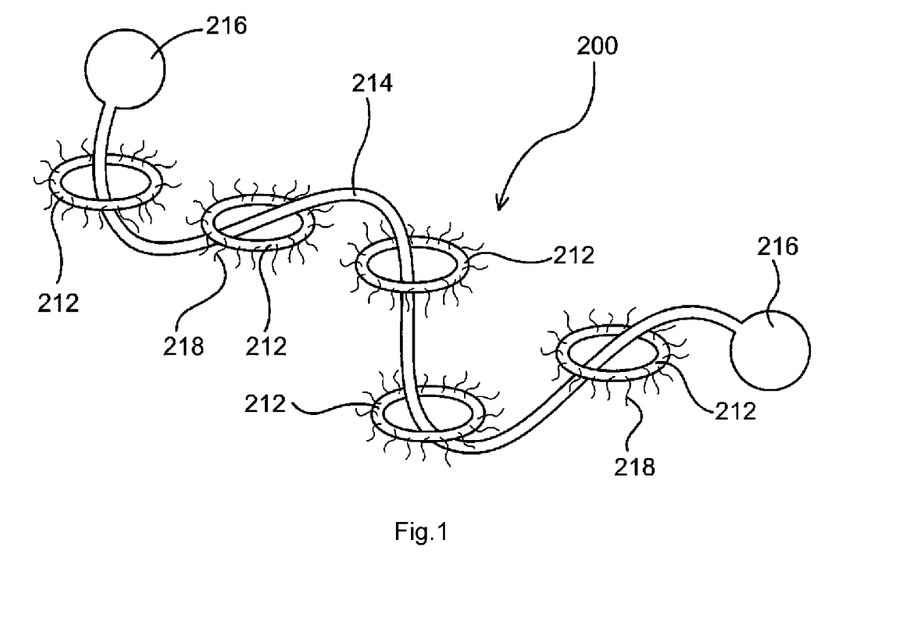
FIG. 1 is an illustrative figure showing a molecular structure of one example of a rotaxane used in the present invention.

FIG. 1 is an illustrative figure showing one example of a molecular structure of a rotaxane used in the present invention. The polyrotaxane 200 has a cyclodextrin 212, a linear molecule 214 piercing through the cyclic structure of the cyclodextrin 212, and blocking groups 216 located at both terminals of the linear molecule 214 to prevent disassociation of the cyclic molecule, wherein a caprolactone chain 218 bonds to an exterior side of the cyclic structure of the cyclodextrin via a —O—$C_2H_6$—O— group (not shown).

The hydroxyl value of the polyrotaxane is preferably 10 mg KOH/g or more, more preferably 15 mg KOH/g or more, and even more preferably 20 mg KOH/g or more, and is preferably 400 mg KOH/g or less, more preferably 300 mg KOH/g or less, even more preferably 220 mg KOH/g or less, and particularly preferably 180 mg KOH/g or less. This is because if the hydroxyl value of the polyrotaxane falls within the above range, the reactivity with the polyisocyanate is enhanced. It is noted that the hydroxyl value can be measured according to JIS K 1557-1, for example, by an acetylation method.

The total molecular weight of the polyrotaxane is preferably 30,000 or more, more preferably 40,000 or more, and even more preferably 50,000 or more, and is preferably 3,000,000 or less, more preferably 2,500,000 or less, and even more preferably 2,000,000 or less, in a weight average molecular weight. This is because if the weight average molecular weight is less than 30,000, the abrasion resistance improvement effect is small, and if the weight average molecular weight is more than 3,000,000, the reactivity with the polyisocyanate is lowered. It is noted that the weight average molecular weight can be measured, for example, by gel permeation chromatography (GPC) using polystyrene as a standard substance, tetrahydrofuran as an eluent, and an organic solvent system GPC column (e.g., "Shodex (registered trademark) KF series" available from Showa Denko K.K.) as a column.

The resin fine particles are preferably crosslinked resin fine particles, and are preferably obtained by curing the polyrotaxane component with a polyisocyanate component. This is because if the polyrotaxane component is cured with the polyisocyanate component, the fine particles having the crosslinked structure are easily obtained.

Examples of the polyisocyanate component constituting the resin fine particles include an aromatic polyisocyanate such as 2,4-tolylene diisocyanate, 2,6-tolylene diisocyanate, a mixture of 2,4-tolylene diisocyanate and 2,6-tolylene diisocyanate (TDI), 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylene diisocyanate (TMXDI), para-phenylene diisocyanate (PPDI); and an alicyclic polyisocyanate or aliphatic polyisocyanate such as 4,4'-dicyclohexylmethane diisocyanate (HINDI), hydrogenated xylylene diisocyanate ($H_6XDI$), hexamethylene diisocyanate (HDI), isophorone diisocyanate (IPDI), and norbornene diisocyanate (NBDI); and derivatives of these polyisocyanates.

The paint film of the golf ball according to the present invention preferably contains the resin fine particles in an amount of less than 10 parts by mass, more preferably in an amount of 8 parts by mass or less, and even more preferably in an amount of 5 parts by mass or less, and preferably in an amount of 1 part by mass or more, more preferably in an amount of 1.5 parts by mass or more, and even more preferably in an amount of 2 parts by mass or more, with respect to 100 parts by mass of the base resin (solid component). If the resin fine particles are contained in an amount falling within the above range, the paint film has enhanced abrasion resistance.

The median particle size (d50, particle size at 50% in the volume accumulation distribution) of the resin fine particles containing the polyrotaxane component used in the present invention is preferably 1 μm or more, more preferably 3 μm or more, and even more preferably 5 μm or more, and is preferably 50 μm or less, more preferably 45 μm or less, and even more preferably 40 μm or less. This is because if the median particle size of the resin fine particles containing the polyrotaxane component falls within the above range, the dispersibility of the resin fine particle in the paint is better.

The resin fine particles preferably have a spherical shape.

The golf ball according to the present invention comprises a golf ball body and a paint film formed on a surface of the golf ball body. The base resin constituting the paint film includes a polyurethane. Next, the polyurethane which is used as the base resin component of the paint film will be explained. The polyurethane is preferably a polyurethane obtained by a reaction between a polyol and a polyisocyanate, and more preferably a polyurethane obtained by a reaction between a polyol and two or more polyisocyanates.

First, the polyisocyanate will be explained. Examples of the polyisocyanate include a compound having at least two isocyanate groups.

Examples of the polyisocyanate include an aromatic polyisocyanate such as 2,4-tolylene diisocyanate, 2,6-tolylene diisocyanate, a mixture of 2,4-tolylene diisocyanate and 2,6-tolylene diisocyanate (TDI), 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylene diisocyanate (TMXDI), para-phenylene diisocyanate (PPDI); and an alicyclic polyisocyanate or aliphatic polyisocyanate such as 4,4'-dicyclohexylmethane diisocyanate ($H_{12}MDI$), hydrogenated xylylene diisocyanate ($H_6XDI$), hexamethylene diisocyanate (HDI), isophorone diisocyanate (IPDI), and norbornene diisocyanate (NBDI); and derivatives of these polyisocyanates. In the present invention, as the polyisocyanate, two or more polyisocyanates are preferably used.

Examples of the derivative of the polyisocyanate include an isocyanurate product of a diisocyanate; an adduct obtained by a reaction between a diisocyanate and a low molecular weight triol such as trimethylolpropane or glycerin; an allophanate product; and a biuret product. The derivative of the polyisocyanate from which free diisocyanates are removed is more preferable. The allophanate product is, for example, a trifunctional polyisocyanate obtained by further reacting a diisocyanate with a urethane bond formed by a reaction between a diisocyanate and a low molecular weight diol. The biuret product is, for example, a trifunctional polyisocyanate having a biuret bond represented by the following chemical formula (1). The isocyanurate product of the diisocyanate is, for example, a trifunctional polyisocyanate represented by the following chemical formula (2). It is noted that in the chemical formulae (1) and (2), R represents a residue where isocyanate groups are removed from the diisocyanate.

(1)

(2)

In the present invention, as the polyisocyanate, a derivative of hexamethylene diisocyanate and a derivative of isophorone diisocyanate are preferably used. As the derivative of the hexamethylene diisocyanate, a biuret product and isocyanurate product of the hexamethylene diisocyanate are preferably used. As the derivative of the isophorone diisocyanate, an isocyanurate product of the isophorone diisocyanate is preferably used.

The mixing ratio (HDI derivative/IPDI derivative) of the derivative of the hexamethylene diisocyanate to the derivative of the isophorone diisocyanate preferably ranges from 80/20 to 50/50, more preferably ranges from 65/35 to 55/45 in a mass ratio. The mixing ratio (biuret product/isocyanurate product) of the biuret product of the hexamethylene diisocyanate to the isocyanurate product of the hexamethylene diisocyanate preferably ranges from 20/40 to 40/20, more preferably ranges from 25/35 to 35/25 in a mass ratio.

The amount of the isocyanate group (NCO %) included in the polyisocyanate is preferably 0.5 mass % or more, more preferably 1 mass % or more, and even more preferably 2 mass % or more, and is preferably 45 mass % or less, more preferably 40 mass % or less, and even more preferably 35 mass % or less. It is noted that the amount of the isocyanate group (NCO %) included in the polyisocyanate can be represented by the following expression.

NCO (%)=100×[mole number of the isocyanate group included in the polyisocyanate×42 (molecular weight of NCO)]/[total mass (g) of the polyisocyanate]

Specific examples of the polyisocyanate include Burnock (registered trademark) D-800, Burnock DN-950, and Burnock DN-955 available from DIC corporation; Desmodur (registered trademark) N75MPA/X, Desmodur N3300, Desmodur L75 (C), and Sumidur E21-1 available from Sumika Bayer Urethane Co., Ltd.; Coronate (registered trademark) HX and Coronate HK available from Nippon Polyurethane Industry Co., Ltd.; Duranate (registered trademark) 24A-100, Duranate 21S-75E, Duranate TPA-100, and Durante TKA-100 available from Asahi Kasei Chemicals Corporation; and VESTANAT (registered trademark) T1890 available from Degussa.

Next, the polyol constituting the polyurethane which is the base resin of the paint film will be explained. Examples of the polyol include a low molecular weight polyol having a molecular weight of less than 500, and a high molecular weight polyol having an average molecular weight of 500 or more. Examples of the low molecular weight polyol include a diol such as ethylene glycol, diethylene glycol, triethylene glycol, 1,3-butanediol, 1,4-butanediol, neopentyl glycol, and 1,6-hexanediol; and a triol such as glycerin, trimethylolpropane, and hexanetriol. Examples of the high molecular weight polyol include a polyether polyol such as polyoxyethylene glycol (PEG), polyoxypropylene glycol (PPG), and polyoxytetramethylene glycol (PTMG); a condensed polyester polyol such as polyethylene adipate (PEA), polybutylene adipate (PBA), and polyhexamethylene adipate (PHMA); a lactone polyester polyol such as poly-ε-caprolactone (PCL); a polycarbonate polyol such as polyhexamethylene carbonate; a urethane polyol; a polyrotaxane; and an acrylic polyol. These polyol compounds may be used solely or as a mixture of at least two of them.

The hydroxyl value of the polyol is preferably 10 mgKOH/g or more, more preferably 15 mgKOH/g or more, and even more preferably 20 mgKOH/g or more, and is preferably 400 mgKOH/g or less, preferably 300 mgKOH/g or less, more preferably 200 mgKOH/g or less, even more preferably 170 mgKOH/g or less, and particularly preferably 160 mgKOH/g or less. This is because if the hydroxyl value of the polyol component falls within the above range, the paint film has enhanced adhesion to the golf ball body. It is noted that, in the present invention, the hydroxyl value can be measured according to JIS K 1557-1, for example, by an acetylation method.

The weight average molecular weight of the polyol is preferably 500 or more, more preferably 550 or more, and even more preferably 600 or more, and is preferably 150,000 or less, more preferably 140,000 or less, and even more preferably 130,000 or less. If the weight average molecular weight of the polyol component falls within the above range, the water resistance and impact resistance of the paint film can be enhanced. It is noted that the weight average molecular weight of the polyol component can be measured, for example, by gel permeation chromatography (GPC), using polystyrene as a standard material, tetrahydrofuran as an eluate, and an organic solvent system GPC column (e.g. "Shodex (registered trademark) KF series" or the like available from Showa Denko K.K.) as a column.

In the present invention, as the polyol component, a urethane polyol is preferably used. The urethane polyol is a compound having a plurality of urethane bonds in its molecule, and having at least two hydroxyl groups in one molecule thereof. Examples of the urethane polyol include a urethane prepolymer obtained by a reaction between a polyol and a polyisocyanate under a condition that the amount of the hydroxyl group included in the polyol is excessive to the amount of the isocyanate group included in the polyisocyanate.

The polyisocyanate component constituting the urethane polyol is not particularly limited, as long as it is a compound having at least two isocyanate groups. Examples of the polyisocyanate component include an aromatic polyisocyanate such as 2,4-tolylene diisocyanate, 2,6-tolylene diisocyanate, a mixture of 2,4-tolylene diisocyanate and 2,6-tolylene diisocyanate (TDI), 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylene diisocyanate (TMXDI), and para-phenylene diisocyanate (PPDI); and an alicyclic polyisocyanate or aliphatic polyisocyanate such as 4,4'-dicyclohexylmethane diisocyanate ($H_{12}$MDI), hydrogenated xylylene diisocyanate ($H_6$XDI), hexamethylene diisocyanate (HDI), isophorone diisocyanate (IPDI), and norbornene diisocyanate (NBDI). These polyisocyanates may be used solely, or at least two of them may be used in combination.

Examples of the polyol component constituting the urethane polyol include those listed as the above described polyol. In the present invention, the polyol component constituting the urethane polyol preferably contains a triol component and a diol component. As the triol component, trimethylolpropane is preferable. As the diol component, polyoxytetramethylene glycol is preferable. The mixing ratio (triol component/diol component) of the triol component to the diol component is preferably 0.2 or more, more preferably 0.5 or more, and is preferably 6.0 or less, more preferably 5.0 or less in a mass ratio.

Specific examples of the polyol compound include 121B available from Wayaku Paint Co. Ltd.; Nippollan (registered trademark) 800 and Nippollan 1100 available from Nippon Polyurethane Industry Co., Ltd.; Burnock (registered trademark) D6-627, Burnock D8-436, Burnock D8-973 and Burnock 11-408 available from DIC Corporation; Desmophen 650MPA, Desmophen 670, Desmophen 1150 and Desmophen A160X available from Sumika Bayer Urethane Co., Ltd.; Hariacron 2000 and Hariacron 8500H available from Harima Chemicals, Inc.; and Polyn (registered trademark) #950 available from Shinto Paint Co., Ltd.

In the reaction between the polyol and the polyisocyanate for forming the polyurethane which is the base resin of the paint film, the molar ratio (NCO group/OH group) of the isocyanate group (NCO group) included in the polyisocyanate to the hydroxyl group (OH group) included in the polyol is preferably 0.5 or more, more preferably 0.6 or more. If the molar ratio (NCO group/OH group) is less than 0.5, the curing reaction is not sufficient, and if the molar ratio (NCO group/OH group) is excessively great, the amount of the isocyanate group becomes excessive, and thus the obtained paint film may become hard and fragile, and the appearance thereof may deteriorate. For this reason, the molar ratio (NCO group/OH group) is preferably 1.6 or less, more preferably 1.5 or less, and even more preferably 1.4 or less. It is noted that the reason why the appearance of the obtained paint film deteriorates if the amount of the isocyanate group is excessive in the paint is considered that if the amount of the isocyanate group is excessive, the moisture in air and the isocyanate group react more frequently, thereby generating a lot of carbon dioxide gas.

The paint film of the golf ball according to the present invention is preferably formed from a curing type paint containing a polyol and a polyisocyanate. As the curing type paint, a curing type paint containing a polyol as a base material and two or more polyisocyanates as a curing agent, is preferable. The paint may be either a waterborne paint mainly containing water as a dispersion medium or a solvent-based paint containing an organic solvent as a dispersion medium. In case of the solvent-based paint, preferable examples of the solvent include toluene, isopropyl alcohol, xylene, methyl ethyl ketone, methyl ethyl isobutyl ketone, ethylene glycol monomethyl ether, ethylbenzene, propylene glycol monomethyl ether, isobutyl alcohol, and ethyl acetate.

Where necessary, the paint may further contain an additive generally contained in a golf ball paint, such as a filler, an ultraviolet absorber, an antioxidant, a light stabilizer, a fluorescent brightener, an anti-blocking agent, a leveling agent, a slip agent, and a viscosity modifier.

The maximum elongation percentage (strain amount at break) of the paint film of the golf ball according to the present invention is preferably 120% or more, more preferably 130% or more, and even more preferably 140% or more. If the maximum elongation percentage of the paint film is 120% or more, the elongation is greater and thus the abrasion resistance is enhanced. The upper limit of the maximum elongation percentage is not particularly limited, and is preferably about 400%, more preferably about 350%.

In the present invention, by containing the polyrotaxane fine particles in the paint film, the abrasion resistance of the paint film can be improved without substantially changing the original hardness of the paint film. The hardness change rate of the hardness of the paint film which contains the polyrotaxane fine particles with respect to the original hardness of the paint film which does not contain the polyrotaxane fine particles is preferably 30% or less, more preferably 20% or less. This is because if the hardness change rate is excessively great, the influence on the spin rate on driver shots or spin rate on approach shots is great.

Next, the method of applying the curing type paint according to the present invention will be explained. The method of applying the curing type paint is not particularly limited, and a conventional method such as a spray coating method or an electrostatic coating method can be employed.

In case of spray coating using an air gun, the polyol component and the polyisocyanate component may be fed with respective pumps and continuously mixed with a line mixer located in the stream line just before the air gun, and the obtained mixture is subjected to spray coating. Alternatively, the polyol component and the polyisocyanate component may be subjected to spray coating separately by using an air spray system provided with a mixing ratio controlling device. The paint application may be conducted by spray coating one time or overspraying several times.

The curing type paint applied to the golf ball body can be dried, for example, at a temperature ranging from 30° C. to 70° C. for 1 hour to 24 hours, to form the paint film.

The thickness of the paint film after drying is not particularly limited, and is preferably 5 μm or more, more preferably 6 μm or more, even more preferably 10 μm or more, and particularly preferably 15 μm or more. This is because if the thickness of the paint film is less than 5 μm, the paint film tends to be easily worn off due to the continued use of the golf ball, and thickening the paint film increases the spin rate on approach shots. Further, the thickness of the paint film after drying is preferably 50 μm or less, more preferably 45 μm or less, even more preferably 40 μm or less, and particularly preferably 20 μm or less. This is because if the thickness of the paint film exceeds 50 μm, the dimple effect may be lowered, and thus the flying performance of the golf ball tends to be lowered. The thickness of the paint film can be measured, for example, by observing the cross section of the golf ball using a microscope (VHX-1000 available from Keyence Corporation). It is noted that in case of overpainting the paint, a total thickness of the formed paint film preferably falls within the above range.

The golf ball according to the present invention is not particularly limited, as long as it comprises a golf ball body and a paint film formed on a surface of the golf ball body. The construction of the golf ball body is not particularly limited, and may be a one-piece golf ball; a two-piece golf ball composed of a core and one cover covering the core; a three-piece golf ball composed of a core, an intermediate layer covering the core, and a cover covering the intermediate layer; a four-piece golf ball; a multi-piece golf ball composed of five or more pieces; or a wound golf ball. The present invention can be applied appropriately to any one of the above golf ball bodies.

Figure 2:
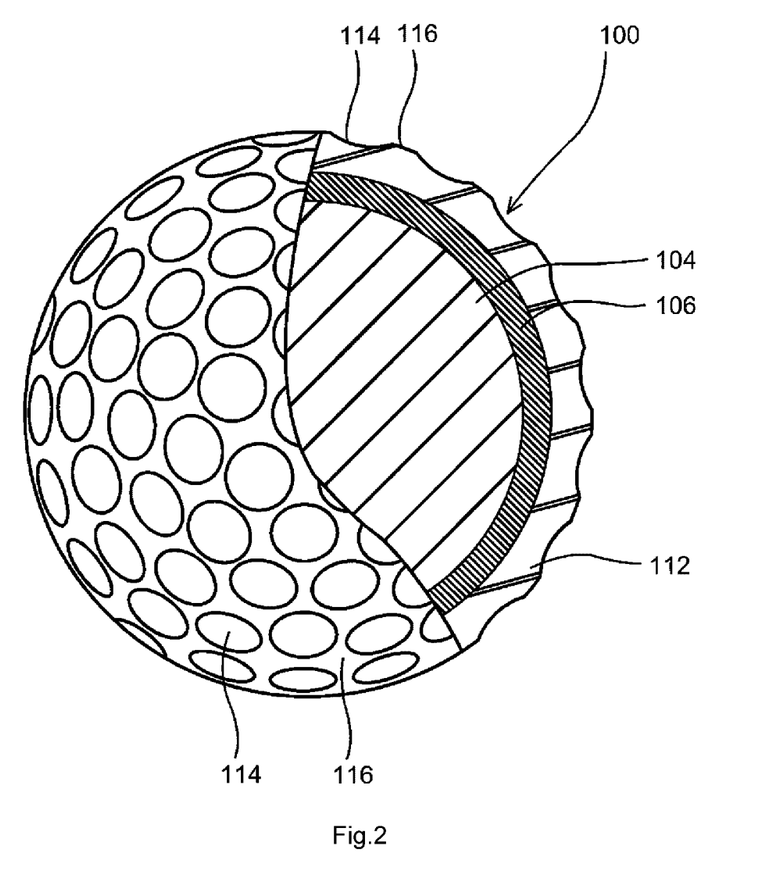
FIG. 2 is a partially cutaway cross-sectional view of a golf ball according to one embodiment of the present invention.

FIG. 2 is a partially cutaway cross-sectional view of a golf ball 2 according to one embodiment of the present invention. The golf ball 2 comprises a spherical core 104, an intermediate layer 106 covering the spherical core 104, and a cover 112 covering the intermediate layer 106. A plurality of dimples 114 are formed on the surface of the cover 112. Other portion than the dimples 114 on the surface of the golf ball is a land 116. The golf ball is provided with a paint layer and a mark layer outside the cover, but these layers are not depicted.

In a preferable embodiment, the cover of the golf ball according to the present invention is formed from a cover composition containing a resin component. The cover material constituting the cover of the golf ball according to the present invention is not particularly limited, and examples thereof include various resins such as an ionomer resin, a polyester resin, a urethane resin such as a thermoplastic urethane resin and a two-component curing type urethane resin, and a polyamide resin; a thermoplastic polyamide elastomer having a trade name of "Pebax (registered trademark) (e.g. "Pebax 2533")" available from Arkema K. K.; a thermoplastic polyester elastomer having a trade name of "Hytrel (registered trademark) (e.g. "Hytrel 3548", "Hytrel 4047")" available from Du Pont-Toray Co., Ltd.; a thermoplastic polyurethane elastomer having a trade name of "Elastollan (registered trademark) (e.g. "Elastollan XNY97A")" available from BASF Japan Ltd.; and a thermoplastic styrene elastomer having a trade name of "TEFABLOC (registered trademark)" or a thermoplastic polyester based elastomer having a trade name of "Primalloy" available from Mitsubishi Chemical Corporation. The cover material may be used solely, or two or more of them may be used in combination.

The cover may include a pigment component such as a white pigment (e.g. titanium oxide), a blue pigment and a red pigment, a weight adjusting agent such as calcium carbonate and barium sulfate, a dispersant, an antioxidant, an ultraviolet absorber, a light stabilizer, a fluorescent material or a fluorescent brightener, or the like, in addition to the above resin component, as long as they do not impair the performance of the cover.

The embodiment for molding the cover from the cover composition is not particularly limited, and examples thereof include an embodiment comprising injection molding the cover composition directly onto the core; and an embodiment comprising molding the cover composition into hollow shells, covering the core with a plurality of the hollow shells and compression molding the core with a plurality of the hollow shells (preferably an embodiment comprising molding the cover composition into half hollow-shells, covering the core with two of the half hollow-shells and compression molding the core with two of the half hollow-shells). After the cover is molded, the obtained golf ball body is ejected from the mold, and as necessary, the golf ball body is preferably subjected to surface treatments such as deburring, cleaning, and sandblast. If desired, a mark may be formed.

It is preferred that the slab hardness of the cover composition is appropriately set in accordance with the desired performance of the golf ball. For example, in case of a so-called distance golf ball which focuses on a flight distance, the cover composition preferably has a slab hardness of 50 or more, more preferably 55 or more, and even more preferably 60 or more, and preferably has a slab hardness of 80 or less, more preferably 70 or less, and even more preferably 68 or less in Shore D hardness. If the cover composition has a slab hardness of 50 or more, the obtained golf ball has a higher launch angle and lower spin rate on driver shots and iron shots, and thus travels a greater flight distance. Further, if the cover composition has a slab hardness of 80 or less, the golf ball excellent in durability is obtained. In addition, in case of a so-called spin golf ball which focuses on controllability, the cover composition preferably has a slab hardness of less than 50, and preferably has a slab hardness of 20 or more, more preferably 25 or more, and even more preferably 30 or more in Shore D hardness. If the cover composition has a slab hardness of less than 50 in Shore D hardness, the obtained golf ball readily stops on the green due to the high spin rate on approach shots. Further, if the cover composition has a slab hardness of 20 or more in Shore D hardness, the abrasion resistance becomes better. In case of a plurality of cover layers, the slab hardness of the cover composition constituting each layer may be identical to or different from each other.

The total number of dimples formed on the cover is preferably 200 or more and 500 or less. If the total number is less than 200, the dimple effect is hardly obtained. On the other hand, if the total number exceeds 500, the dimple effect is hardly obtained because the size of the respective dimples is small. The shape (shape in a plan view) of dimples includes, for example, without limitation, a circle, a polygonal shape such as a roughly triangular shape, a roughly quadrangular shape, a roughly pentagonal shape, a roughly hexagonal shape, and other irregular shape. The shape of dimples is employed solely or at least two of them may be used in combination.

The golf ball preferably has a diameter in a range of from 40 mm to 45 mm. In light of satisfying a regulation of US Golf Association (USGA), the diameter is preferably 42.67 mm or more. In light of prevention of air resistance, the diameter is preferably 44 mm or less, more preferably 42.80 mm or less. The golf ball preferably has a mass of 40 g or more and 50 g or less. In light of obtaining greater inertia, the mass is preferably 44 g or more, more preferably 45.00 g or more. In light of satisfying a regulation of USGA, the mass is preferably 45.93 g or less.

When the golf ball according to the present invention has a diameter in a range of from 40 mm to 45 mm, the compression deformation amount of the golf ball (shrinking amount of the golf ball along the compression direction) when applying a load from 98 N as an initial load to 1275 N as a final load to the golf ball is preferably 1.7 mm or more, more preferably 1.8 mm or more, and even more preferably 1.9 mm or more, and is preferably 4.5 mm or less, more preferably 4.4 mm or less, and even more preferably 4.3 mm. If the compression deformation amount is 1.7 mm or more, the golf ball does not become excessively hard, and thus the shot feeling thereof becomes better. On the other hand, if the compression deformation amount is 4.5 mm or less, the resilience of the golf ball becomes higher.

Next, the core used in a wound golf ball, two-piece golf ball and multi-piece golf ball, and one-piece golf ball body will be explained.

The core and one-piece golf ball body can be formed from a conventional rubber composition (hereinafter sometimes simply referred to as "core rubber composition"). For example, the core and one-piece golf ball body can be molded by heat pressing a rubber composition containing a base rubber, a co-crosslinking agent and a crosslinking initiator.

As the base rubber, particularly preferred is a high-cis polybutadiene having a cis bond in an amount of 40 mass % or more, preferably 70 mass % or more, and more preferably 90 mass % or more in view of its superior resilience. As the co-crosslinking agent, an α,β-unsaturated carboxylic acid having 3 to 8 carbon atoms or a metal salt thereof is preferable, and a metal salt of acrylic acid or a metal salt of methacrylic acid is more preferable. As the metal constituting the metal salt, zinc, magnesium, calcium, aluminum or sodium is preferable, and zinc is more preferable. The amount of the co-crosslinking agent is preferably 20 parts by mass or more and 50 parts by mass or less with respect to 100 parts by mass of the base rubber. As the crosslinking initiator, an organic peroxide is preferably used. Specific examples of the organic peroxide include dicumyl peroxide, 1,1-bis(t-butylperoxy)-3,3,5-trimethylcyclohexane, 2,5-dimethyl-2,5-di(t-butylperoxy) hexane, and di-t-butyl peroxide. Among them, dicumyl peroxide is preferably used. The amount of the crosslinking initiator is preferably 0.2 part by mass or more, more preferably 0.3 part by mass or more, and is preferably 3 parts by mass or less, more preferably 2 parts by mass or less, with respect to 100 parts by mass of the base rubber. In addition, the core rubber composition may further contain an organic sulfur compound. As the organic sulfur compound, diphenyl disulfides, thiophenols or thionaphthols are preferably used. The amount of the organic sulfur compound is preferably 0.1 part by mass or more, more preferably 0.3 part by mass or more, and is preferably 5.0 parts by mass or less, more preferably 3.0 parts by mass or less, with respect to 100 parts by mass of the base rubber. The core rubber composition may further contain a carboxylic acid and/or a salt thereof. As the carboxylic acid and/or the salt thereof, a carboxylic acid having 1 to 30 carbon atoms and/or a salt thereof is preferable. The amount of the carboxylic acid and/or the salt thereof is preferably 1 part by mass or more and 40 parts by mass or less with respect to 100 parts by mass of the base rubber.

The core rubber composition may further contain a weight adjusting agent such as zinc oxide and barium sulfate, an antioxidant, a colored powder, or the like in addition to the base rubber, the co-crosslinking agent, the crosslinking initiator, and the organic sulfur compound. The molding conditions for heat pressing the core rubber composition may be determined appropriately depending on the rubber composition. Generally, the heat pressing is preferably carried out at 130° C. to 200° C. for 10 to 60 minutes, or carried out in a two-step heating of heating at 130° C. to 150° C. for 20 to 40 minutes followed by heating at 160° C. to 180° C. for 5 to 15 minutes.

In the case that the golf ball according to the present invention is a multi-piece golf ball such as a three-piece golf ball, and a golf ball comprising four or more pieces, examples of the material used for the intermediate layer disposed between the core and the outmost cover include a thermoplastic resin such as a polyurethane resin, an ionomer resin, a polyamide resin, and polyethylene; a thermoplastic elastomer such as a styrene elastomer, a polyolefin elastomer, a polyurethane elastomer, and a polyester elastomer; and a cured product of a rubber composition. Herein, examples of the ionomer resin include a product obtained by neutralizing, with a metal ion, at least a part of carboxyl groups in a copolymer composed of ethylene and an α,β-unsaturated carboxylic acid; and a product obtained by neutralizing, with a metal ion, at least a part of carboxyl groups in a terpolymer composed of ethylene, an α,β-unsaturated carboxylic acid and an α,β-unsaturated carboxylic acid ester. The intermediate layer may further include a weight adjusting agent such as barium sulfate and tungsten, an antioxidant, and a pigment. It is noted that the intermediate layer may be referred to as an inner cover layer or an outer core depending on the construction of the golf ball.

EXAMPLES

Next, the present invention will be described in detail by way of examples. However, the present invention is not limited to the examples described below. Various changes and modifications without departing from the spirit of the present invention are included in the scope of the present invention.
[Evaluation Methods]
(1) Compression Deformation Amount A compression deformation amount of the core or golf ball (a shrinking amount of the core or golf ball along the compression direction), when applying a load from an initial load of 98 N to a final load of 1275 N to the core or golf ball, was measured.
(2) Slab Hardness (Shore D Hardness)

Sheets with a thickness of about 2 mm were produced by injection molding the resin composition. The sheets were stored at 23° C. for two weeks. At least three of these sheets were stacked on one another so as not to be affected by the measuring substrate on which the sheets were placed, and the hardness of the stack was measured with an automatic hardness tester (Digitest II, available from Bareiss company) using a testing device of "Shore D".

(3) Tensile Test of Paint Film

The tensile properties of the paint film were measured according to JIS K7161 (2014). Specifically, the base agent and the curing agent were blended to prepare a paint, and the obtained paint was dried and cured at 40° C. for 4 hours to prepare a paint film (thickness: 0.05 mm). The paint film was punched out to prepare a test piece according to the test piece type 2 (width of parallel part: 10 mm, gauge length: 50 mm) prescribed in JIS K7127 (1999). The tensile test of the test piece was conducted using a precision universal tester (Autograph (registered trademark) available from Shimadzu Corporation) under testing conditions of a length between grips: 100 mm, a tensile speed: 50 mm/min and a testing temperature: 23° C.
(4) Spin Rate on Driver Shots (rpm)

A driver provided with a titanium head (Trade name: SRIXON Z745, Loft angel: 8.5°, available from Dunlop Sports Limited) was installed on a swing robot M/C available from True Temper Sports, Inc. The golf ball was hit at a head speed of 50 m/sec, and the spin rate of the golf ball immediately after the hitting was measured. The measurement was conducted ten times for each golf ball, and the average value thereof was adopted as the measurement value of the golf ball. It is noted that the spin rate of the golf ball immediately after the hitting was measured by continuously taking a sequence of photographs of the hit golf ball.
(5) Abrasion Resistance of Paint Film In a ball mill having a volume of 7 liters, 2500 g of grinding stone ("AT3" available from Tipton Corporation) and 2500 ml of water were filled. In this ball mill, 40 golf balls were charged. The ball mill was rotated at a rotation speed of 50 rpm for 1 hour, and the appearance of the golf balls after the ball milling was visually checked and evaluated as follows.

E (excellent): Number of the balls whose paint film has a peeling area larger than one or more dimple, is less than 5.

G (good): Number of the balls whose paint film has a peeling area larger than one or more dimple, is 5 or more and less than 10.

F (fair): Number of the balls whose paint film has a peeling area larger than one or more dimple, is 10 or more and less than 20.

P (poor): Number of the balls whose paint film has a peeling area larger than one or more dimple, is 20 or more.
(6) Measurement of Median Particle Size The test sample was set in a dry type unit of a laser diffraction particle size measuring apparatus (LMS-2000e type available from Seishin Enterprise Co., Ltd.), and the particle size thereof was measured at a test sample refractive index of 1.52. The median size (d50) was obtained from the obtained volume-based frequency distribution graph.
[Production of Golf Ball Body]

100 parts by mass of a high-cis polybutadiene (trade name "BR-730" available from JSR Corporation), 31 parts by mass of zinc acrylate, 5 parts by mass of zinc oxide, an appropriate amount of barium sulfate, 0.5 part by mass of diphenyl disulfide and 0.8 part by mass of dicumyl peroxide were kneaded to obtain the rubber composition. The rubber composition was charged into a mold composed of upper and lower molds, each having a hemispherical cavity, and heated at 160° C. for 20 min to obtain a spherical core having a diameter of 39.8 mm. It is noted that the amount of barium sulfate was adjusted such that the golf ball had an appropriate mass.

47 parts by mass of an ionomer resin (above described "Himilan 1555"), 46 parts by mass of other ionomer resin (above described "Himilan 1557"), 7 parts by mass of a thermoplastic elastomer containing a styrene block (above described "TEFABLOC T3221C"), 4 parts by mass of titanium dioxide and 0.2 part by mass of a light stabilizer (trade name "JF-90" available from Johoku chemical Co., Ltd.) were kneaded with a twin-screw kneading extruder to obtain the cover composition. The core was charged in a final mold composed of upper and lower molds, each having a hemispherical cavity. This final mold had a plurality of pimples on the cavity surface. The melted cover composition was filled around the spherical core by an injection molding method to mold the cover. After the cover molding, the golf ball body was ejected from the mold. The cover had a thickness of 1.45 mm. Dimples having an inverted shape of the pimples were formed on the cover. Properties of the golf ball bodies are summarized in Table 1.

TABLE 1

| \multicolumn{4}{c}{Golf ball body} | | | |
|---|---|---|---|
| Core composition | Formulation (parts by mass) | Polybutadiene rubber | 100 |
| | | Zinc acrylate | 31 |
| | | Zinc oxide | 5 |
| | | Barium sulfate | Appropriate amount |
| | | Diphenyl disulfide | 0.5 |
| | | Dicumyl peroxide | 0.8 |
| | Diameter (mm) | | 39.8 |
| Cover composition | Formulation (parts by mass) | Himilan 1555 | 47 |
| | | Himilan 1557 | 46 |
| | | TEFABLOC T3221C | 7 |
| | Slab hardness (Shore D) | | 57 |
| | Thickness (mm) | | 1.45 |
| Properties | Diameter (mm) | | 42.7 |
| | Compression deformation amount (mm) | | 3.2 |

Polybutadiene: "BR730 (high-cis polybutadiene)" available from JSR Corporation
ZN-DA90S: zinc acrylate (a product coated with 10 mass % of zinc stearate) available from Nihon Jyoryu Kogyo Co., Ltd.
Zinc oxide: "Ginrei R" available from Toho Zinc Co., Ltd.
Barium sulfate: "Barium Sulfate BD" available from Sakai Chemical Industry Co., Ltd.
Diphenyl disulfide: available from Sumitomo Seika Chemicals Co., Ltd.
Dicumyl peroxide: "Percumyl (registered trademark) D" available from NOF Corporation
Himilan 1555: Sodium ion-neutralized ethylene-methacrylic acid copolymer ionomer resin available from Du Pont-Mitsui Polychemicals Co., Ltd.
Himilan 1557: Zinc ion-neutralized ethylene-methacrylic acid copolymer ionomer resin available from Du Pont-Mitsui Polychemicals Co., Ltd.
TEFABLOC T3221C: thermoplastic polystyrene elastomer available from Mitsubishi Chemical Corporation Preparation of curing type polyurethane paint The following polyol composition and polyisocyanate composition were prepared for the curing type polyurethane paint.

Polyol Composition (Urethane Polyol)

As a polyol component, polytetramethylene ether glycol (PTMG, number average molecular weight: 650) and trimethylolpropane (TMP) were dissolved in a solvent (toluene and methyl ethyl ketone). It is noted that the molar ratio (PTMG:TMP) was 1.8:1.0. Dibutyltin dilaurate was added as a catalyst therein in an amount of 0.1 mass % with respect to the total amount of the base material. While keeping the temperature of the obtained polyol solution at 80° C., isophorone diisocyanate (IPDI) as a polyisocyanate component was added dropwise to the polyol solution and mixed. It is noted that the molar ratio (NCO/OH) of the NCO group included in the polyisocyanate component to the OH group included in the polyol component was 0.6. After the dropwise adding, stirring was continued until the isocyanate group no longer existed. Then, the reaction liquid was cooled to a room temperature to obtain the urethane polyol (solid content: 30 mass %). In the obtained polyol composition, the amount of PTMG was 67 mass %, the hydroxyl value of the solid content was 67.4 mgKOH/g, and the urethane polyol had a weight average molecular weight of 4867.

Polyisocyanate Composition 30 parts by mass of an isocyanurate product of hexamethylene diisocyanate (Duranate (registered trademark) TKA-100 (NCO amount: 21.7 mass %) available from Asahi Kasei Chemicals Corporation), 30 parts by mass of a biuret product of hexamethylene diisocyanate (Duranate 21S-75E (NCO amount: 15.5 mass %) available from Asahi Kasei Chemicals Corporation), and 40 parts by mass of an isocyanurate product of isophorone diisocyanate (Desmodur (registered trademark) Z 4470 (NCO amount: 11.9 mass %) available from Bayer company) were mixed. As a solvent, a mixed solvent of methyl ethyl ketone, n-butyl acetate and toluene was added therein to adjust the concentration of the polyisocyanate component to 60 mass %.

Figure 3:
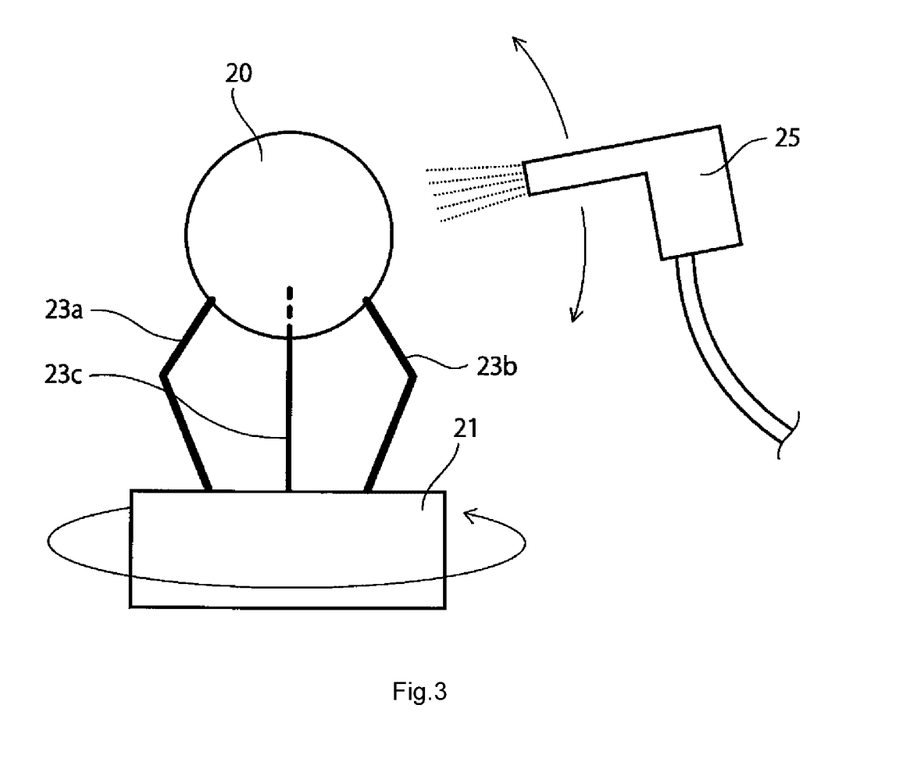
FIG. 3 is a schematic figure showing one example of a paint applying embodiment using an air gun.

According to the formulations shown in Table 2, the polyol composition, the polyisocyanate composition and the resin fine particles containing the polyrotaxane component were blended to obtain curing type polyurethane paints. The surface of the obtained golf ball bodies was subjected to a sandblast treatment, and a mark was formed thereon. Then, the curing type polyurethane paints were applied to the golf ball body by using a spray gun, and dried in an oven of 40° C. for 24 hours to obtain golf balls having a diameter of 42.7 mm and a mass of 45.6 g. The paint film had a thickness of 10 μm. The golf ball body was placed in a rotating member shown in FIG. 3, the rotating member was allowed to rotate at 300 rpm, and application of the paint was conducted by spacing a spray distance (7 cm) between the air gun and the golf ball body while moving the air gun in an up and down direction. The painting interval in the overpainting operation was 1.0 second. Application of the paint was conducted under the air gun spraying conditions of a spraying air pressure: 0.15 MPa, a compressed air tank pressure: 0.10 MPa, a painting time for one application: 1 second, an atmosphere temperature: 20° C. to 27° C., and an atmosphere humidity: 65% or less. Evaluation results of the obtained golf balls are shown in Table 2.

TABLE 2

| | Golf ball No. | | | | | | | | |
|---|---|---|---|---|---|---|---|---|---|
| | No. 1 | No. 2 | No. 3 | No. 4 | No. 5 | No. 6 | No. 7 | No. 8 | No. 9 |
| Polyurethane curing type paint (NCO/OH molar ratio) | 1.2 | 0.6 | 0.6 | 0.6 | 0.6 | 0.6 | 1.2 | 0.6 | 0.6 |
| SH2400B-0501*[1)] | — | — | 20 | 1 | 3 | 5 | 9 | 9 | — |
| SH2400B-2001*[1)] | — | — | — | — | — | — | — | — | 5 |
| Spin rate on driver shots (50 m/s) | 2800 | 2740 | 2740 | 2740 | 2740 | 2740 | 2800 | 2740 | 2740 |
| Maximum elongation percentage of paint film % | 110 | 140 | 140 | 145 | 150 | 155 | 120 | 160 | 155 |
| Abrasion resistance | P | F | F | G | E | E | G | E | E |

*[1)]Amount (parts by mass) with respect to 100 parts by mass of the base resin

Polyrotaxane fine particles SH2400B-0501 available from Advanced Softmaterials Inc.: crosslinked resin fine particles obtained by curing polyrotaxane with polyisocyanate, median particle size (d50): 7.4 μm, decomposition starting temperature: 306° C.

Polyrotaxane fine particles SH2400B-2001 available from Advanced Softmaterials Inc.: crosslinked resin fine particles obtained by curing polyrotaxane with polyisocyanate, median particle size (d50): 20 μm, decomposition starting temperature: 306° C.

It can be seen from the results of Table 2 that, the golf ball comprising a golf ball body and a paint film formed on a surface of the golf ball body, wherein the paint film contains a base resin containing a polyurethane and further contains resin fine particles in an amount of less than 10 parts by mass with respect to 100 parts by mass of the base resin, the resin fine particles contain a polyrotaxane component having a cyclodextrin, a linear molecule penetrating the cyclic structure of the cyclodextrin in a skewering manner, and blocking groups located at both terminals of the linear molecule to prevent disassociation of the cyclodextrin, wherein at least a part of hydroxyl groups of the cyclodextrin is modified with a caprolactone chain via a —O—$C_3H_6$—O— group, has improved abrasion resistance without substantially lowering the spin performance.

The present invention is suitably applied to a painted golf ball

This application is based on Japanese patent application No. 2018-195343 filed on Oct. 16, 2018, the content of which is hereby incorporated by reference.

The invention claimed is:

1. A golf ball comprising a golf ball body and a paint film formed on a surface of the golf ball body, wherein
   the paint film contains resin fine particles in an amount of less than 10 parts by mass with respect to 100 parts by mass of a base resin thereof,
   the base resin of the paint film includes a polyurethane, and
   the resin fine particles contain a polyrotaxane component having a cyclodextrin, a linear molecule penetrating the cyclic structure of the cyclodextrin in a skewering manner, and blocking groups located at both terminals of the linear molecule to prevent disassociation of the cyclodextrin, wherein at least a part of hydroxyl groups of the cyclodextrin is modified with a caprolactone chain via a —O—$C_3H_6$—O— group.

2. The golf ball according to claim 1, wherein the resin fine particles have a median particle size (d50) in a range of from 1 μm to 50 μm.

3. The golf ball according to claim 1, wherein the resin fine particles are crosslinked resin fine particles.

4. The golf ball according to claim 3, wherein the crosslinked resin fine particles are a product obtained by a reaction between the polyrotaxane component and a polyisocyanate component.

5. The golf ball according to claim 1, wherein the linear molecule of the polyrotaxane is polyethylene glycol, and the blocking group of the polyrotaxane is an adamantyl group.

6. The golf ball according to claim 1, wherein the paint film has a thickness in a range of 5 μm or more and 20 μm or less.

7. The golf ball according to claim 1, wherein the base resin constituting the paint film is a polyurethane obtained by a reaction between a polyol and two or more polyisocyanates.

8. The golf ball according to claim 7, wherein in the reaction between the polyol and the polyisocyanates, a molar ratio (NCO/OH) of an isocyanate group (NCO group) included in the polyisocyanates to a hydroxyl group (OH group) included in the polyol is 0.5 or more and 1.6 or less.

9. The golf ball according to claim 7, wherein the polyisocyanates contain a derivative of hexamethylene diisocyanate and a derivative of isophorone diisocyanate.

10. The golf ball according to claim 1, wherein the amount of the resin fine particles is 1 part by mass or more and less than 10 parts by mass with respect to 100 parts by mass of the base resin of the paint film.

11. The golf ball according to claim 1, wherein the resin fine particles have a median particle size (d50) in a range of from 5 μm to 40 μm.

12. The golf ball according to claim 1, wherein the resin fine particles are spherical.

13. The golf ball according to claim 1, wherein the paint film has a maximum elongation percentage of 120% or more.

14. The golf ball according to claim 7, wherein the polyol includes a urethane polyol.

15. The golf ball according to claim 14, wherein a polyol component constituting the urethane polyol contains a triol component and a diol component.

16. The golf ball according to claim 15, wherein a mass ratio (triol component/diol component) of the triol component to the diol component is 0.2 or more and 6.0 or less.

17. The golf ball according to claim 15, wherein the triol component includes trimethylolpropane, and the diol component includes polyoxytetramethylene glycol.

18. The golf ball according to claim 1, wherein the amount of the resin fine particles is 1 part by mass or more and 9 parts or less by mass with respect to 100 parts by mass of the base resin of the paint film.

* * * * *